(12) United States Patent
Yamamoto et al.

(10) Patent No.: US 11,152,661 B2
(45) Date of Patent: Oct. 19, 2021

(54) BATTERY PACK

(71) Applicant: TOYOTA JIDOSHA KABUSHIKI KAISHA, Toyota (JP)

(72) Inventors: Satomi Yamamoto, Miyoshi (JP); Koichi Tanimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 16/361,603

(22) Filed: Mar. 22, 2019

(65) Prior Publication Data

US 2019/0296289 A1 Sep. 26, 2019

(30) Foreign Application Priority Data

Mar. 26, 2018 (JP) .............................. JP2018-058633

(51) Int. Cl.
*H01M 50/20* (2021.01)
*H01M 10/0525* (2010.01)
(Continued)

(52) U.S. Cl.
CPC ....... *H01M 50/20* (2021.01); *H01M 10/0481* (2013.01); *H01M 10/0525* (2013.01); *H01M 50/543* (2021.01); *H01M 2220/20* (2013.01)

(58) Field of Classification Search
CPC ......... H01M 10/0481; H01M 10/0468; H01M 10/65; H01M 10/655; H01M 6/46;
(Continued)

(56) References Cited

U.S. PATENT DOCUMENTS

2008/0131759 A1 6/2008 Hosaka et al.
2012/0100413 A1* 4/2012 Okano ................ H01M 50/148
429/152
(Continued)

FOREIGN PATENT DOCUMENTS

CN 101202363 A 6/2008
JP 2009-187889 A 8/2009
(Continued)

OTHER PUBLICATIONS

English Translation of JP2015118822. Battery Device. 2015. Nissan Motor Co. Ltd. https://patentscope.wipo.int/search/en/detail.jsf?docPN=JP2015118822 (Year: 2015).*

*Primary Examiner* — Maria Laios
*Assistant Examiner* — Adam J Francis
(74) *Attorney, Agent, or Firm* — Sughrue Mion, PLLC (57) ABSTRACT

Provided by the present disclosure is a batten pack in which both battery performance and durability of an all solid state battery are improved. Provided is a battery pack provided with a plurality of single batteries and a constraining mechanism. The constraining mechanism constrains the arranged single batteries in such a way that stress exists in the direction of compression along the arrangement direction. In addition, in a direction which intersects the arrangement direction, when a direction in which the external connection terminals extend is deemed to be a first direction and the direction opposite the first direction is deemed to a second direction, the constraining mechanism is configured in such a way that the stress increases from the first direction towards the second direction.

6 Claims, 7 Drawing Sheets (51) Int. Cl.
*H01M 50/543* (2021.01)
*H01M 10/04* (2006.01)
(58) Field of Classification Search
CPC .............. H01M 50/20; H01M 50/543; H01M 10/0525; H01M 10/04; H01M 2/1077; H01G 2/10
See application file for complete search history.

(56) References Cited

U.S. PATENT DOCUMENTS

| | | | | |
|---|---|---|---|---|
| 2014/0308556 A1* | 10/2014 | Obata | .................... | H01M 6/46 429/94 |
| 2016/0268573 A1* | 9/2016 | Ishihara | ................ | H01M 50/20 |

FOREIGN PATENT DOCUMENTS

| | | | |
|---|---|---|---|
| JP | 2015-118822 A | | 6/2015 |
| JP | 2015118822 A | * | 6/2015 |
| JP | 2016-170917 A | | 9/2016 |
| KR | 10-2017-0038300 A | | 4/2017 |

* cited by examiner

BATTERY PACK

CROSS-REFERENCE

The present application claims priority to Japanese Patent Application No. 2018-058633, which was filed on 26 Mar. 2018, and the entire contents of that application are incorporated by reference in the present specification.

1. FIELD

The disclosure relates to a battery pack obtained by stacking and constraining a plurality of single batteries.

2. BACKGROUND

In recent years, secondary batteries such as lithium ion batteries have become indispensable as portable power sources for personal computers, handheld devices, and the like, as primary power sources for vehicles such as electric vehicles (EV), hybrid vehicles (HV) and plug-in hybrid vehicles (PHV), and as power sources for power storage. In addition, batteries used in applications requiring large capacities and high outputs are generally used in the form of battery packs obtained by overlaying and bundling a plurality of single batteries (battery cells) in the thickness direction. Japanese Patent Application Publication Nos. 2009-187889, 2015-118822 and 2016-170917 can be given as examples of prior art relating to battery packs.

SUMMARY

For such battery packs, proposals have been made to alter the constraining force on single batteries according to the configuration of individual single batteries and the way in which a battery pack is to be installed. For example, Patent Literature 1 discloses constructing a battery pack in such a way that a pressing force decreases from the side of a current collecting tab towards a pressure release portion, at least when gas is generated. Due to this configuration, gas generated by decomposition of a non-aqueous electrolyte solution in a single battery is moved towards the pressure release portion and can be smoothly discharged from the pressure release portion. In addition, Patent Literature 2, for example, discloses a battery pack comprising single batteries that include non-aqueous electrolyte solutions, wherein cases where electrode plates are disposed in a vertical direction, the lower parts of the electrode plates in the vertical direction are pressed more strongly than the upper parts of the electrode plates in the vertical direction. Due to this configuration, it is possible to suppress localization of the non-aqueous electrolyte solution in the lower part of a single battery and improve durability.

However, these are secondary batteries provided with a pressure release portion and a non-aqueous electrolyte solution, and are effective only in specific aspects. For example, there is no mention of the occurrence of a current density distribution that occurs universally in single batteries, non-uniformity of a battery reaction as a result of this occurrence, or a deterioration in battery durability.

In view of these circumstances, the purpose of the present disclosure is to provide a battery pack in which both battery performance and durability are improved in an all solid state battery that is a constituent element of the battery pack.

The disclosure provides a battery pack comprises a plurality of single batteries and a constraining mechanism. In each of the plurality of single batteries, an electrode plate and a solid electrolyte layer are housed in a battery case and these single batteries are arranged in the thickness direction of the electrode plates and solid electrolyte layers as an arrangement direction. The constraining mechanism constrains the arranged plurality of single batteries in such a way that stress exists in the direction of compression along the arrangement direction. In addition, the single batteries are provided with external connection terminals that are connected to the electrode plates and extend to the outer part of the battery case. In addition, when a direction in which the external connection terminals extend is deemed to be a first direction and the direction opposite the first direction is deemed to a second direction, the constraining mechanism is configured in such a way that the stress, corresponds to the constraining force, increases from the first direction towards the second direction.

In ordinary single batteries, the current density decreases from the side close to an external terminal towards the side distant from the external terminal, and reactions inside a single battery are non-uniform. According to the configuration mentioned above, however, a single battery is configured in such a way that a constraining force increases from the side close to an external terminal towards the side distant from the external terminal. Due to this configuration, the single battery is configured in such a way that internal resistance decreases from the side close to the external terminal towards the side distant from the external terminal, meaning that current density becomes uniform. Due to this configuration, battery characteristics of a battery pack are improved, and the long term durability of the battery pack is also improved. Moreover, the distribution of this constraining force can lead to liquid depletion in a liquid type secondary battery that contains a non-aqueous electrolyte solution, which is not desirable. In the disclosure, this advantageous effect can be achieved by applying this type of constraining force distribution to an all solid state battery provided with a solid electrolyte.

In a preferred aspect of the disclosure, the constraining mechanism comprises a pair of end plates, which are disposed at both ends in the arrangement direction so as to hold an arranged plurality of single batteries, a constraining member, which are laid across the pair of end plates and which regulate the distance between the end plates, and an insertion member, which are disposed between the pair of end plates. In addition, the insertion member is configured in such a way that the size in the arrangement direction increases from the first direction towards the second direction. Due to this type of simple configuration, it is possible to advantageously impart a constraining force gradient to the plurality of single batteries.

In a preferred aspect of the disclosure, the constraining mechanism comprises a pair of end plates, which are disposed at both ends in the arrangement direction so as to hold an arranged plurality of single batteries, a constraining member, which are laid across the pair of end plates and which regulate the distance between the end plates, and an insertion member, which is disposed between the pair of end plates. In addition, the insertion member is configured in such a way that the spring constant thereof increases from the first direction towards the second direction. In addition, the insertion member is preferably uniform in size in the arrangement direction. Due to this configuration, even if the thicknesses of the insertion member is uniform, it is possible to advantageously impart the constraining force gradient to the plurality of single batteries when the battery pack is assembled. Due to this configuration, it is possible to realize a battery pack conveniently and with high precision, which is desirable.

In a preferred aspect of the disclosure, the insertion member is constituted from an elastic material. By constituting the insertion member from an elastic material, it is possible to advantageously absorb dimensional changes in the arrangement direction when the single batteries are charged and discharged, and also possible to maintain a uniform constraining force applied to the single batteries. Due to this configuration, it is possible to greatly increase the durability of the battery pack, which is desirable.

DETAILED DESCRIPTION

Preferred embodiments of the battery pack disclosed here will now be explained while referring to the drawings as appropriate. Moreover, the embodiments explained here are, of course, not intended to particularly limit the disclosure. The battery pack disclosed here can be carried out on the basis of the matters disclosed in the present specification and common general technical knowledge in this technical field. In addition, in the present specification, a numerical range indicated by "X to Y" means "not less than X and not more than Y".

In the drawings shown below, members and parts having the same action are given the same reference symbols, and duplicate explanations may be omitted or simplified. In the drawings, the reference symbols X, Y and Z indicate the longitudinal direction, transverse direction and thickness direction, respectively, of a single battery, and the thickness direction Z is the same as the arrangement direction. Moreover, the size in the arrangement direction Z may also be referred to simply as the "thickness". In addition, the reference symbols X1, X2, Y1, Y2, Z and Z2 in the drawings indicate the first direction, the second direction, the positive electrode external connection terminal side, the negative electrode external connection terminal side, the top, and the bottom, respectively. Moreover, in the present embodiment, the longitudinal direction X, the transverse direction Y and the arrangement direction Z are perpendicular to each other. However, these are merely directions used for the sake of convenience in explanations, and in no way limit the way in which the battery pack is arranged or used.

Embodiment 1

Battery Pack

Figure 1:
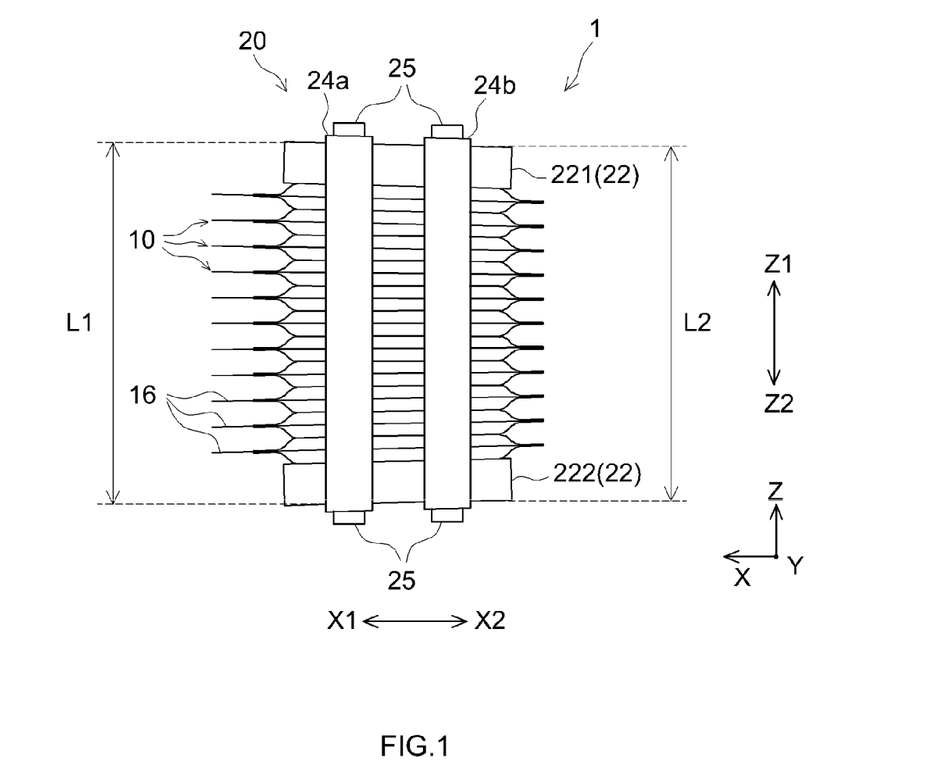
FIG. 1 is a frontal view that schematically illustrates a battery pack according to one embodiment.
Figure 2:
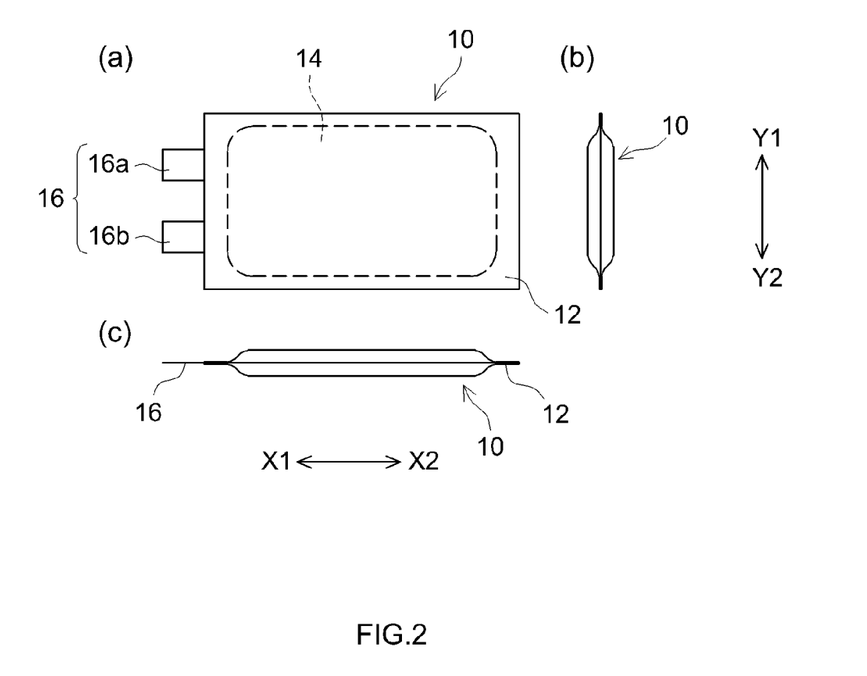
FIG. 2 is (a) a planar view, (b) a frontal view and (c) a side view that schematically illustrate a single battery shown in FIG. 1.

FIG. 1 is a frontal view that schematically illustrates a battery pack 1 according to one embodiment. FIG. 2 comprises three diagrams that schematically illustrate a single battery 10. The battery pack 1 is provided with a plurality of single batteries 10 and a constraining mechanism 20. The plurality of single batteries 10 are arranged in the prescribed arrangement direction Z. The constraining mechanism 20 is a member used for constrainment so that these single batteries 10 can be handled as a group of batteries. Each element will now be explained.

Single Battery

Typically, the single battery 10 is not particularly limited in terms of charging and discharging mechanism, configuration, and the like, as long as the single battery is a secondary battery that can be repeatedly charged and discharged. For example, the single battery 10 is a lithium ion secondary battery, a nickel metal-hydride battery, an electrical double layer capacitor, or the like. Moreover, in the case of secondary batteries, there have been developments in terms of commercialization of all solid state batteries comprising ion-conducting ceramics, polymers, and the like, which do not use flammable electrolyte solutions as electrolytes in order to improve safety. In the disclosure, the single battery 10 is preferably provided with this type of solid electrolyte. Explanations will now be given using a case in which the single battery 10 is an all solid state lithium ion battery as an example, but the configuration of the single battery 10 is not limited to a lithium ion battery. Typically, a single battery 10 is provided with a power-generating element 14, which comprises electrode plates (not shown) and a solid electrolyte, and a battery case 12. An individual single battery 10 may be provided with only one power-generating element 14, or with two or more (for example 3 to 5) power-generating elements. With regard to this matter, the "single battery" mentioned in the present specification is a "unit battery" specified in JIS D 0114: 2000, and the "power-generating element" mentioned in the present specification can be a thus specified "single battery". This power-generating element 14 is housed in the battery case 12.

In the case of an all solid state batters, the power-generating element 14 is configured by disposing a solid electrolyte in the form of a layer between a positive electrode plate and negative electrode plate that serve as electrode plates. The positive electrode plate and negative electrode plate are provided with a positive electrode active substance layer and negative electrode active substance layer, respectively. The solid electrolyte exhibits charge carrier conductivity while electrically insulating the positive electrode plate from the negative electrode plate. By disposing the positive electrode plate and negative electrode plate so as to face each other, with the solid electrolyte interposed therebetween, charge carriers can move back and forth between the positive electrode plate and the negative electrode plate. Due to this configuration, the power-generating element 14 can effect charging and discharging.

The solid electrolyte layer and the positive and negative active substance layers may be formed as dense bulk materials by means of CVD, for example, but may also be configured by binding a powdery (particulate) electrode-constituting material using a binder. Because an electrolyte solution is not present in the all solid state battery, interfacial resistance between the solid electrolyte layer and the positive and negative active substance layers is higher than in a liquid type secondary battery provided with an electrolyte solution. In addition, in an all solid state battery produced using a powdery material, interfacial resistance also occurs between particles that constitute the solid electrolyte layer and the positive and negative active substance layers. Therefore, from the perspective of more clearly exhibiting the advantageous effect of the disclosure, a material formed using a powdery electrode-constituting material can be advantageously used as the power-generating element 14.

The solid electrolyte layer contains a solid electrolyte material as a primary component. The solid electrolyte material exhibits conductivity of, for example, charge carrier ions (lithium ions in this case), but a variety of compounds that do not exhibit electron conductivity can be advantageously used. Specific examples of such solid electrolyte materials include non-crystalline sulfides such as $Li_2S$—$SiS_2$, $LiI$—$Li_2S$—$SiS_2$, $LiI$—$Li_2S$—$P_2S_5$, $LiI$—$Li_2S$—$B_2S_3$, $Li_3PO_4$—$Li_2S$—$Si_2S$, $Li_3PO_4$—$Li_2S$—$SiS_2$, $LiPO_4$—$Li_2S$—$SiS$, $LiI$—$Li_2S$—$P_2O_5$, $LiI$—$Li_3PO_4$—$P_2S_5$, $LiI$—$Li_3PS_4$—$LiBr$, $Li_2S$—$P_2S_5$, $Li_2S$—$P_2S_5$—$LiI$—$LiBr$ and $Li_2S$—$P_2S_5$—$GeS_2$; non-crystalline oxides such as $Li_2O$—$B_2O_3$—$P_2O_5$, $Li_2O$—$SiO_2$, $Li_2O$—$B_2O_3$ and $Li_2O$—$B_2O_3$—$ZnO$; crystalline sulfides such as $Li_{10}GeP_2S_{12}$; crystalline oxides such as $Li_{1.3}Al_{0.3}Ti_{0.7a}(PO_4)_3$, $Li_{1+x+y}A^1_xTi_{2-x}Si_yP_{3-y}O_{12}$ ($A^1$ is Al or Ga, $0 \le x \le 0.4$, and $0 < y \le 0.6$), $[(A^2_{1/2}Li_{1/2})_{1-z}C_z]TiO_3$ ($A^2$ is La, Pr, Nd or Sm, C is Sr or Ba, and $0 \le z \le 0.5$), $Li_5La_3Ta_2O_{12}$, $Li_7La_3Zr_2O_{12}$, $Li_6BaLa_2Ta_2O_{12}$ and $Li_{3.6}Si_{0.6}P_{0.4}O_4$; crystalline oxynitrides such as $Li_3PO_{(4-3,2/w)}N_w$ ($w<1$); crystalline nitrides such as $Li_3N$; and crystalline iodides such as $LiI$, $LiI$—$Al_2O_3$ and $Li_3N$—$LiI$—$LiOH$. Of these, non-crystalline sulfides can be advantageously used from the perspective of exhibiting excellent lithium ion conductivity.

Moreover, semi-solid polymer electrolytes such as lithium salt-containing polyethylene oxide, polypropylene oxide, polyvinylidene fluoride and polyacrylonitrile can also be used as solid electrolytes.

In addition, in the present specification, the term "as a primary component" means that the component in question is contained at a quantity of 50 mass % or more, and can be contained at a quantity of preferably 60 mass % or more, and more preferably 70 mass % or more, for example 80 mass % or more.

The positive electrode active substance layer contains a positive electrode active substance as a primary component. The negative electrode active substance layer contains a negative electrode active substance as a primary component. A variety of materials able to be used as electrode active substances in all solid state batteries can be used as the positive electrode active substance and negative electrode active substance. For example, a variety of compounds capable of occluding and releasing lithium ions can be advantageously used. The positive electrode active substance and negative electrode active substance are not clearly limited, and it is possible to, for example, compare the charging and discharging potentials of two types of active substance material and use the material having a relatively high charging and discharging potential in the positive electrode and using the material having a lower charging and discharging potential in the negative electrode.

Examples of such active substance materials include layered rock salt type lithium-transition metal oxides such as lithium cobaltate (for example, $LiCoO_2$), lithium nickelate (for example, $LiNiO_2$) and $Li_{1+x}Co_{1/3}Ni_{1/3}Mn_{1/3}O_2$ (x satisfies the formula $0 \le x < 1$); spinel type lithium-transition metal oxides such as lithium manganate (for example, $LiMn_2O_4$) and heteroelement-substituted Li—Mn spinel type compounds having compositions represented by $Li_{1+x}Mn_{2-x-y}M^1_yO_4$ ($M^1$ is at least one type of metallic element selected from among Al, Mg, Ti, Co, Fe, Ni and Zn, and x and y each independently satisfy the formula $0 \le x$, $y \le 1$); oxides such as lithium titanate (for example, $Li_xTiO_y$, wherein x and y each independently satisfy the formula $0 \le x$, $y \le 1$), lithium-metal phosphates (for example, $LiM^2PO_4$, wherein $M^2$ is Fe, Mn, Co or Ni), vanadium oxide (for example, $V_2O_5$) and molybdenum oxide (for example, $MoO_3$): titanium sulfide (for example, $TiS_2$): carbon materials such as graphite and hard carbon: lithium cobalt nitrides (for example, LiCoN), lithium silicon oxides (for example, $Li_xSi_yO_z$, wherein x, y and z each independently satisfy the formula $0 \le x$, y, $z \le 1$): metallic lithium (Li), silicon (Si), tin (Sn) and oxides of these (for example, SiO and $SnO_2$), lithium alloys (for example, $LiM^3$, wherein $M^3$ is C, Sn, Si, Al, Ge, Sb, Pb or P), lithium-storing intermetallic compounds (for example, $Mg_xM^4$ and $M^5_ySb$, wherein $M^4$ is Sn, Ge or Sb, and $M^5$ is In, Cu or Mn): and derivatives and composites of these.

In addition, in the positive and negative active substance layers, a part of the active substance material may be substituted with a solid electrolyte material mentioned above in order to increase lithium ion conductivity in the layer. In such cases, the proportion of solid electrolyte material incorporated in the active substance layer can be, for example, 60 mass % or less, preferably 50 mass % or less, and more preferably 40 mass % or less, if the overall quantity of active substance material and solid electrolyte material is taken to be 100 mass %. In addition, the proportion of solid electrolyte material when this substitution is carried out should be 10 mass % or more, preferably 20 mass % or more, and more preferably 30 mass % or more. In cases where this type of substitution between active substance material and solid electrolyte material takes place, the positive and negative active substance layers can be constituted mainly from the active substance material and solid electrolyte material.

Moreover, in cases where a solid electrolyte comprising a sulfide is incorporated in a positive electrode active substance layer having a higher potential, a high resistance reaction layer is formed at an interface between the positive electrode active substance and the solid electrolyte, and this leads to concerns that interfacial resistance will increase. Therefore, in order to prevent this type of occurrence, it is possible to coat positive electrode active substance particles with a lithium ion-conducting crystalline oxide. Oxides represented by the general formula $Li_xA^3O_y$ can be given as examples of the lithium ion-conducting oxide that coats the positive electrode active substance. In the formula. $A^3$ is B, C, Al, Si, P, S, Ti, Zr, Nb, Mo, Ta or W. and x and y are positive numbers. Specific examples of lithium ion-conducting oxides able to be used include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. In addition, the lithium ion-conducting oxide may be a composite oxide comprising an arbitrary combination of lithium ion-conducting oxides, such as $Li_4SiO_4$—$Li_3BO_3$ or $Li_4SiO_4$—$Li_3PO_4$.

In cases where the surface of a positive electrode active substance particle is coated with an ion-conducting oxide, the ion-conducting oxide should coat at least a part of the positive electrode active substance, and may coat the entire surface of the positive electrode active substance particle. The thickness of the ion-conducting oxide that coats the positive electrode active substance particle is, for example, preferably 0.1 nm or more, and more preferably 1 nm or more. In addition, the thickness of the ion-conducting oxide is, for example, preferably 100 nm or less, and more preferably 20 nm or less. Moreover, the thickness of the ion-conducting oxide can be measured using, for example, an electron microscope such as a transmission electron microscope (TEM).

The positive and negative active substance layers may, if necessary, contain an electrically conductive material in order to increase electron conductivity. The electrically conductive material is not particularly limited, and carbon black such as acetylene black (AB) or ketjen black (KB), vapor grown carbon fibers (VGCF), carbon nanotubes, carbon nanofibers and other types of carbon material, for example, can be advantageously used. If the overall quantity of the electrode active substance layer is taken to be 100 mass %, the quantity of this type of electrically conductive material is, for example, 1 mass % or more, and may fall within the range 1 to 12 mass % or fall within the range 2 to 10 mass %.

Moreover, in cases where the power-generating element 14 is formed using a powdery electrode-constituting material, the average particle diameter ($D_{50}$) of the material is not particularly limited, and a material having the size mentioned below can be given as a preferred example. That is, in cases where the solid electrolyte layer is constituted from a powdery material, the average particle diameter is, for example, approximately 0.1 µm or more, and is preferably 0.4 µm or more. In addition, the average particle diameter of the solid electrolyte material can be, for example, 50 µm or less, and is preferably 5 µm or less. In cases where an electrode active substance layer is constituted from a powdery material, the average particle diameter is, for example, 0.1 µm or more, and may be 0.5 µm or more. Meanwhile, the average particle diameter is, for example, 50 µm or less, and may be 5 µm or less. In cases where a powdery material is processed into the form of a granular powder, the average particle diameter of primary particles should fall within the ranges mentioned above.

Moreover, the average particle diameter in the present specification is the particle diameter corresponding to a cumulative 50% in a volume-based particle size distribution measured using a laser diffraction/light scattering particle size distribution analyzer. Moreover, for ultrafine powders having an average particle diameter of 1 µm or less, a measured value obtained using dynamic light scattering (DLS) may be used.

In addition, in cases where the power-generating element 14 is formed using a powdery electrode-constituting material, the binder for binding the electrode-constituting material is not particularly limited, and it is possible to use, for example, a variety of organic compounds having binding properties. Examples of such binders include polytetrafluoroethylene, polytrifluoroethylene, polyethylene, cellulose resins, acrylic resins, vinyl resins, nitrile rubbers, polybutadiene rubbers, butyl rubbers, polystyrene, styrene-butadiene rubbers, styrene-butadiene latexes, polysulfide rubbers, acrylonitrile-butadiene rubbers, polyvinyl fluoride, polyvinylidene fluoride (PVDF) and fluorocarbon rubbers. It is possible to use one of these binders in isolation or a combination of two or more types thereof.

Moreover, in cases where the positive and negative active substance layers are formed using powdery electrode-constituting materials, by supporting the positive and negative active substance layers on current collectors, production and handling becomes straightforward, and it is possible to extract electrical power to an external load with high efficiency. The form of the current collector is not particularly limited, and a variety of sheet-shaped forms, such as foil-shaped, plate-shaped and mesh-shaped forms, are suitable. In addition, the active substance layer should be provided on, for example, a surface (one surface for both surfaces) of the current collector. This type of current collector can be a variety of materials which exhibit excellent electron conductivity and which are unlikely to degenerate at the charging and discharging potential of the active substance being used. Examples of current collector materials include aluminum, copper, nickel, iron, titanium, alloys of these (for example, aluminum alloys and stainless steel alloys) and carbon materials. The thickness of the current collector depends on the size and the like of an electrode body, and is not therefore particularly limited, and is, for example, preferably 5 to 500 µm, and more preferably 10 to 100 µm.

In cases where the single battery 10 contains only one power-generating element 14, the active substance layer should be provided on one surface of the current collector. In such cases, it is possible to construct the power-generating element 14 by, for example, overlaying a positive electrode, which is obtained by providing a positive electrode active substance layer on one surface of a positive electrode current collector, and a negative electrode, which is obtained by providing a negative electrode active substance layer on one surface of a negative electrode current collector, with a solid electrolyte layer interposed therebetween so that the active substance layers face each other. In cases where the single battery 10 contains two or more power-generating elements 14, the active substance layer should be provided on both surfaces of the current collector. In such cases, it is possible to construct a plurality of power-generating elements 14 by, for example, preparing a plurality of positive electrodes, which is obtained by providing a positive electrode active substance layer on both surfaces of a positive electrode current collector, and a plurality of negative electrodes, which is obtained by providing a negative electrode active substance layer on both surfaces of a negative electrode current collector, and alternatively overlaying in such a way that the positive and negative active substance layers are insulated by a solid electrolyte layer.

The shape of the current collector is not particularly limited. From the perspective of forming a single battery 10 that enables the battery pack 1 to be easily constructed, a rectangular current collector is generally used. For example, the external shape of the current collector can be a rectangular shape that corresponds to the shape of the power-generating element 14, which is shown by the dashed line in FIG. 2. The external connection terminal 16 is electrically connected to the current collector (or to the positive and negative active substance layers in cases where there is no current collector). The external connection terminal 16 is provided with a positive electrode terminal 16a and a negative electrode terminal 16b. The positive electrode terminal 16a is electrically connected to the positive electrode current collector of the power-generating element 14, and the negative electrode terminal 16b is electrically connected to the negative electrode current collector of the power-generating element 14. The external connection terminal 16 may be such that the current collector is extended so as to be integrally configured as a part of the external connection terminal 16, but the external connection terminal 16 may be provided as a separate member from the current collector and mechanically connected to the current collector. In order to increase current collection efficiency, the external connection terminal 16 is disposed along the electrode surface and the surface of the current collector.

The external connection terminal 16 may be connected to any position on the periphery of the current collector. The external connection terminal 16 may be connected to a long side or short side on the periphery of a rectangular current collector. In addition, the positive electrode external current connection terminal 16a and negative electrode external current connection terminal 16b may both be connected to a long side or short side of the current collector, or one external current connection terminal may be connected to a long side and the other external current connection terminal may be connected to a short side. In addition, in cases where both external current connection terminals are connected to a long side or short side, the positions of the positive electrode external current connection terminal 16a and negative electrode external current connection terminal 16b on the positive electrode plate and negative electrode plate may be adjusted so as to be positioned on the same side in the longitudinal direction X or transverse direction Y. or the positive electrode external current connection terminal 16a and negative electrode external current connection terminal 16b may be adjusted so as to be positioned on opposite sides in the longitudinal direction X or transverse direction Y. From the perspective of further reducing the volume of the battery pack 1, the positive electrode external current connection terminal 16a and negative electrode external current connection terminal 16b should be positioned on the same side in the longitudinal direction X or transverse direction Y. In addition, from the perspective of maintaining smaller parts in the external shape of the battery pack 1, the positive electrode external current connection terminal 16a and negative electrode external current connection terminal 16b should be connected to a short side of the current collector and should be positioned on the same side in the longitudinal direction X (the first direction X1 shown in FIG. 2).

The configuration, shape, and the like, of the battery case 12 are not particularly limited. For example, it is possible to use a battery case having a well-known three-dimensional shape, such as a square shape, a cylindrical shape or a coin-like shape, or a flexible bag-shaped battery bag. In the present embodiment, the battery case 12 is a laminated bag constituted from a soft metal-laminated film. The battery case 12 is an exterior packaging material that houses the power-generating element 14. The metal-laminated film is configured by bonding a lightweight relatively soft metal foil such as aluminum or copper to an insulating thermoplastic resin sheet such as polyethylene (PE), polypropylene (PP), polystyrene or an amide-based resin, and has a high degree of freedom in terms of deformation. As a result, the battery case 12 comprising a metal-laminated film is such that a constraining force can be applied more effectively to the power-generating element 14 by means of the constraining mechanism 20 described later, compared to a case in which a three-dimensional battery case comprising a metal can or the like is used. In addition, by constituting the battery case 12 from the metal laminated film, it is possible to reduce the thickness and weight of the single battery 10. For example, by housing the power-generating element 14 in a bag comprising the metal-laminated film (typically an aluminum/PP laminated sheet) and then sealing the bag by means of heat welding, the battery case 12 can shield the power-generating element 14 from the surrounding environment. Here, the positive electrode terminal 16a and negative electrode terminal 16b are drawn out as the external connection terminal 16 from the outside of the battery case 12. However, the battery case 12 is not limited to a metal-laminated film, and may be a container which comprises aluminum, steel, a highly strong plastic, or the like, and which has a square, cylindrical or coin-like shape.

As shown in FIG. 2, the single battery 10 includes a rectangular plate-shaped power-generating element 14 that is longer in the longitudinal direction X in a planar view. In the power-generating element 14, a positive electrode active substance layer, a solid electrolyte layer and a negative electrode active substance layer, which are rectangular in a planar view, are stacked in the thickness direction Z. The battery case 12 that houses the power-generating element 14 is also a rectangular shape that is longer in the longitudinal direction X in a planar view. In those parts of the battery case 12 where the power-generating element 14 is not present, the metal-laminated film is welded and the size in the thickness direction Z is small in a planar view and a side view. In addition, the external connection terminal 16 is disposed so as to protrude from the end of the battery case 12 in the first direction X1 of the longitudinal direction X. The positive electrode terminal 16a and negative electrode terminal 16b of the external connection terminal 16 are disposed so as to be apart from each other in the transverse direction Y. Within the transverse direction Y, the positive electrode terminal 16a side is referred to as the positive electrode side Y1 and the negative electrode terminal 16b side is referred to as the negative electrode side Y2 for the sake of convenience. A plurality of such single batteries 10 are arranged and stacked in such a way that the thickness direction of the power-generating elements 14 is the arrangement direction Z. A battery stack comprising a plurality of arranged single batteries 10 is configured in this way.

Constraining Mechanism

The constraining mechanism 20 is provided with a pair of end plates 22, constraining members 24a and 24b, and fixing members 25. The end plates 22 are plate-shaped members used for applying a constraining force as a planar force to power-generating elements 14 of single batteries 10. The constraining members 24a and 24b are members used for maintaining the constraining force applied between the end plates 22 within the end plates 22.

The pair of end plates 22 are disposed at both ends so as to sandwich the plurality of arranged single batteries 10 (hereinafter referred to simply as a "battery stack" in some cases) in the arrangement direction Z. The end plates 22 consist of a first end plate 221 and a second end plate 222. The first end plate 221 is disposed at the top Z1 end of the arranged single batteries 10 in the arrangement direction Z. The second end plate 222 is disposed at the bottom Z2 end of the arranged single batteries 10 in the arrangement direction Z. The end plates 22 are such that the size in the transverse direction Y is similar to, or slightly larger than, the size of the battery case 12 in the transverse direction Y. The end plates 22 are such that the size in the longitudinal direction X is similar to, or slightly larger than, the size of the power-generating element 14 in the longitudinal direction X. The end plates 22 should be configured so as to be at least slightly larger than power-generating elements 14 of single batteries 10 in a planar view so that localized stress is not applied to electrode surfaces in the power-generating elements 14.

In the present embodiment, the constraining members 24a and 24b are a fixed shape, that is, are not flexible. The constraining members 24a and 24b are channel shaped in a side view, so that both ends of a long band-like member are folded at angles of approximately 90° towards the same side. The constraining members 24a and 24b lay across the sides of the pair of end plates 22 in the arrangement direction Z, so that the folded parts at both ends lay across the top surface of the first end plate 221 and the bottom surface of the second end plate 222. The folded parts at the ends of the constraining members 24a and 24b are fixed to the top surface of the first end plate 221 and the bottom surface of the second end plate 222 by fixing members 25. Configuring in this way regulates movement of the pair of end plates 22 in the direction that separates the end plates along the arrangement direction Z. In the present example, when the battery stack is held by the pair of end plates 22 and the constraining members 24a and 24b are attached, the constraining members 24a and 24b are attached in a state whereby compressive stress is applied to the battery stack in the arrangement direction Z. The size of the constraining members 24a and 24b in the arrangement direction Z is set so that only a prescribed amount of compressive stress can be maintained. By configuring in this way, a state in which a prescribed constraining force (pressing force) is always applied to the battery stack in the arrangement direction Z is maintained by the constraining mechanism 20.

The fixing members 25 are bolt screws in the present example, but the configuration of the fixing members 25 is not limited to this. The fixing members 25 are finished by screw shafts passing through fixing holes (not shown) provided in the constraining members 24a and 24b and fitting into screw holes provided in the top surface of the first end plate 221 and the bottom surface of the second end plate 222. Due to this configuration, the ends of the constraining members 24a and 24b are firmly fixed at prescribed positions on the end plates 22. In the present embodiment, the constraining mechanism 20 is provided with one constraining member 24a and one constraining member 24b towards both the first direction X1 side and second direction X2 side from the center of the longitudinal direction X of the end plates 22. The constraining members 24a and 24b are provided on the surfaces (front surface and back surface) of the end plates 22 on the positive electrode side Y1 and negative electrode side Y2 in the transverse direction Y. The end plates 22 is provided with a total of four constraining members 24a and 24b. As a result, a total of eight fixing members 25 are provided at the ends of the constraining members 24a and 24b. However, the number and arrangement of the constraining members and fixing members are not limited to these.

Here, the constraining members 24a and 24b have mutually different sizes in the arrangement direction Z, as shown in FIG. 1. The size (internal size) of the first constraining member 24a in the arrangement direction Z is denoted by L1, the size (internal size) of the second constraining member 24b in the arrangement direction Z is denoted by L2, and L1 is longer than L2 (L1>L2). Due to this configuration, in a plurality of single batteries 10, a higher constraining force is applied to the second direction X2 side than to the first direction X1 side relative to the center of the longitudinal direction X of the end plates 22. In other words, in a plurality of single batteries 10, if the center of the longitudinal direction X is bisected, a higher constraining force is applied to a region on the side further from the external connection terminal 16 than to a region on the side nearer to the external connection terminal 16.

Moreover, in the present embodiment, the thicknesses of the end plates 22 are uniform, and the surfaces of the end plates 22 that are in contact with the battery stack are flat. In addition, because the constraining members 24a and 24b have mutually different sizes in the arrangement direction Z, as mentioned above, the distance between the pair of end plates 22 gradually decreases from the first direction X1 towards the second direction X2 along the longitudinal direction X. Therefore, the constraining force applied to the battery stack gradually increases from the first direction X1 towards the second direction X2 along the longitudinal direction X. In other words, the constraining force applied to the plurality of single batteries 10 gradually increases in the longitudinal direction X from the side on which the external connection terminal 16 is provided towards the side on which the external connection terminal 16 is not provided. The plurality of single batteries 10 has a pressure gradient that increases from the first direction X1 towards the second direction X2.

In secondary batteries in general, charge carriers are occluded and released between a solid electrolyte layer and positive and negative electrodes, and charging and discharging is effected by electrochemical reactions resulting from this occlusion and release. Here, charges generated as a result of an electrode active substance releasing electrolyte ions move from the electrode active substance layer and the electrode current collector to the external connection terminal 16, and are taken out to an external load. Here, the density of charge moving in the electrode active substance layer and electrode current collector (that is, the current density) is relatively high near the external connection terminal 16 and relatively low at locations distant from the external connection terminal 16. In other words, a current density distribution occurs in electrodes. Therefore, because reactions in electrodes are not uniform in conventional single batteries, only certain parts of single batteries are exhaustively used and localized degradation can occur. This can lead to a deterioration in the durability of a single battery, and even of a battery pack as a whole. As mentioned above, however, the single battery 10 in the disclosure has a pressure gradient that increases from the side on which the external connection terminal 16 is provided (X1) towards the side on which the external connection terminal is not provided (X2), as shown in Table 1. Due to this configuration, it is possible to reduce (narrow) the distance between the positive and negative electrodes on the second direction X2 side along the longitudinal direction X of the single battery 10. Due to this configuration, the electrode-constituting materials are arranged more densely, and at least one type of internal resistance, such as interfacial resistance between a current collector, an electrode active substance layer and a solid electrolyte layer, electron resistance between active substance particles that constitute an electrode active substance layer, ion resistance between solid electrolyte particles that constitute a solid electrolyte layer, and diffusion resistance, are reduced. As a result, it is possible to facilitate electrochemical reactions and the like and increase current density on the second direction X2 side along the longitudinal direction X of the single battery 10. In other words, it is possible to make the current density distribution more uniform along the longitudinal direction X of the single battery 10 and enable the entire battery to effectively contribute to electrochemical reactions. As a result, it is possible to make reactions more uniform in single batteries 10. Due to this configuration, each of a plurality of single batteries 10 can improve battery performance and increase durability. Moreover, because the single battery 10 is an all solid state battery and does not contain a non-aqueous electrolyte solution, problems such as depletion of a non-aqueous electrolyte solution on the second direction X2 side do not occur as a result of the pressure gradient of the constraining force that increases towards the second direction X2. It can be said that this advantageous effect is a characteristic effect that is realized by the battery pack 1 provided with single batteries 10 comprising all solid state batteries.

TABLE 1

|  |  | Side close to current collection terminal (X1) | Side far from current collection terminal (X2) |
|---|---|---|---|
| Single battery | Current density | High | Low |
| Battery pack | Constraining load | Small | Large |
|  | Distance between electrodes | Wide | Narrow |
|  | Internal resistance | High | Low |
|  | Current density | Uniform | |

Moreover, the constraining force applied to the battery pack 1 can be set as appropriate according to, for example, the materials used to constitute the electrode active substance layers and the solid electrolyte layer, and intended battery performance. For example, if Ps denotes the average constraining force (average planar force) when carrying out charging and discharging under prescribed conditions and applying a uniform constraining force without providing a pressure gradient in the longitudinal direction X, this average constraining force can be, for example, approximately 0.1 MPa or more, preferably 1 MPa or more, more preferably 2 MPa or more, and particularly preferably 5 MPa or more, for example 10 MPa or more. The upper limit of the average constraining force is not particularly limited, but can be set as appropriate according to the maximum constraining force that can be applied to a single battery 10 by a battery assembly apparatus or the like. This average constraining force can be, for example, approximately 50 MPa or less, for example 20 MPa or less. Such a high constraining force can be approximately 5 to 10 or more times the constraining force able to be applied to a battery pack comprising single batteries that use non-aqueous electrolyte solutions.

In addition, in the battery pack 1 disclosed here, it is possible to provide a pressure gradient in which the constraining force close to the external connection terminal 16 in the longitudinal direction X of the single battery 10 is lower than the value of Ps mentioned above and the constraining force at a position distant from the external connection terminal 16 is higher than the value of Ps mentioned above. For example, it is possible to provide a pressure gradient in which the constraining force is lower than the value of Ps mentioned above on the side of the external connection terminal 16 (the first direction X) from the center of the longitudinal direction X of the single battery 10 and the constraining force is higher than the value of Ps mentioned above on the side that is distant from the external connection terminal 16 (the second direction X2) from the center of the longitudinal direction. In the pressure gradient, the pressure may change either continuously or incrementally. Such a pressure gradient can be realized by, for example, appropriately designing the sizes (the internal sizes of the soccer goal post shape) of the constraining members 24a and 24b in the arrangement direction Z in view of the sizes of the plurality of single batteries 10 following constrainment and the thicknesses (the sizes in the thickness direction Z) of the pair of end plates 22 so that the useful pressure and gradient can be achieved.

The constraining force P1 at the end in the first direction X1 of the longitudinal direction X of the single battery 10 may be 0.1×Ps or more, 0.2×Ps or more, 0.5×Ps or more for 0.7×Ps or more, for example 0.9×Ps or more. In addition, the constraining force P2 at the end in the second direction X2 of the longitudinal direction X of the single battery 10 may be 10×Ps or less, 5×Ps or less, 3×Ps or less or 2×Ps or less, for example 1.5×Ps or less. In this way, by deciding the pressure gradient of the constraining force on the battery pack 1 as a whole on the basis of the average constraining force Ps when the constraining force has no pressure gradient, it is possible to apply a more appropriate constraining load and assemble the battery pack 1 conveniently.

The end plates 22 and constraining members 24a and 24b that constitute the constraining mechanism 20 are not particularly limited in terms of materials and the like as long as a prescribed constraining force can be applied to the battery stack. For example, the end plates 22 and constraining members 24a and 24b can be constituted using materials that do not undergo plastic deformation when the prescribed constraining force is applied. Examples of such materials include materials for which the yield point (and more specifically, the upper yield point) is higher than the constraining force. Specifically, the end plates 22, for example, may be constituted from a material having a higher bending stress than the maximum constraining force so that bending deformation (plastic deformation) does not occur as a result of the maximum constraining force applied in the second direction X2. The constraining members 24a and 24b may be constituted from a material having a higher yield point (for example, upper yield point) than the maximum constraining force so that tensile plastic deformation (for example, localized elongation) does not occur as a result of the maximum constraining force applied in the second direction X2. Examples of such materials include metal materials such as aluminum, aluminum alloys, iron and a variety of steel materials (for example, structural steels) and high strength alloys: resin materials such as reinforced plastics and engineering plastics; inorganic materials having high bending strengths and/or tensile strengths, such as fine ceramics and carbon fiber materials: and composite materials of these, such as carbon fiber-reinforced plastics (CFRP). The end plates 22 and constraining members 24a and 24b may be constituted from materials that are the same as, or different from, each other.

These yield points and bending stresses can be measured in accordance with, for example, JIS Z2241: 2011 and JIS Z2248: 2006 (in the case of metal materials), depending on the type of material being used.

Moreover, in the present embodiment, the number of constraining members 24a and 24b was four each and the number of fixing members 25 was eight. In addition, the constraining members 24a and 24b all had the same shape. However, the form of the battery pack disclosed here is not limited to this. For example, a higher constraining force can be applied in the second direction X2 than in the first direction X1. Therefore, the constraining members 24b disposed in the second direction X2 may be constituted from a material that is stronger and configured so as to be larger in the longitudinal direction X (wider) than the constraining members 24a disposed in the first direction X1.

Figure 3:
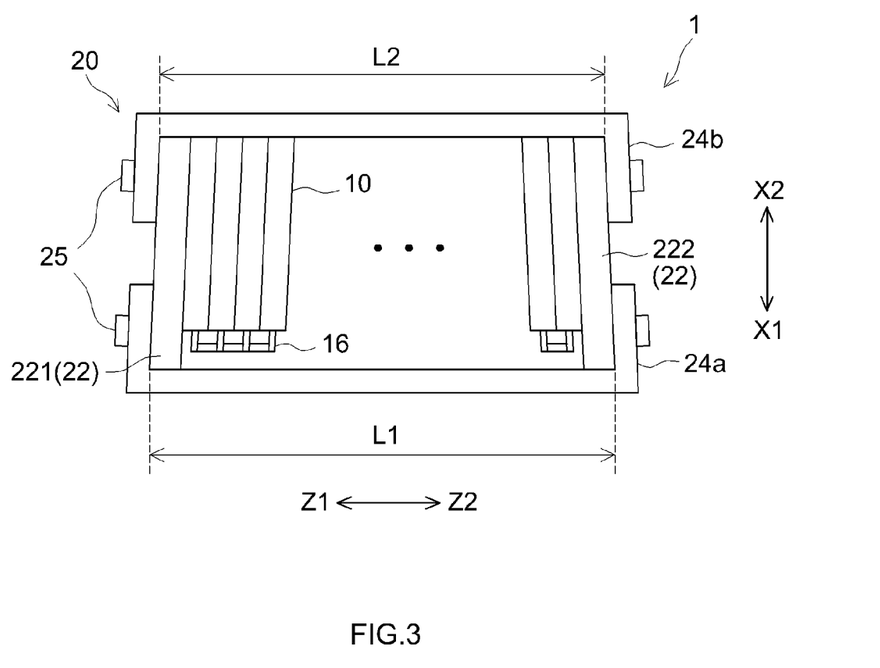
FIG. 3 is a frontal schematic view that explains the configuration of the battery pack shown in FIG. 1.

In addition, in FIG. 1, the constraining members 24a and 24b are laid over the end surfaces in the transverse direction Y of the end plates 22 (and the electrode stack) along the arrangement direction Z, but the positions of the constraining members 24a and 24b are not limited to this. For example, the constraining members 24a and 24b may be laid over the end surfaces in the longitudinal direction X of the end plates 22 (and the battery stack) along the arrangement direction Z, as shown in FIG. 3. In this case, the size of the end plates 22 in the longitudinal direction X should be greater than the size of the single battery 10 in the longitudinal direction. In addition, the constraining members 24a and 24b may be disposed on the end surfaces in the longitudinal direction X in such a way that two or more constraining members are apart from each other in the transverse direction Y, or only one constraining member 24a and one constraining member 24b may be disposed on the end surfaces. In cases where one constraining member 24a and one constraining member 24b are provided in both the first direction X1 and the second direction X2, the sizes of the constraining members 24a and 24b in the transverse direction Y should be increased (the constraining members should be widened). In addition, in such cases, two or more fixing members 25 may be provided for one constraining member 24a or 24b.

Embodiment 2

Battery Pack

Figure 4:
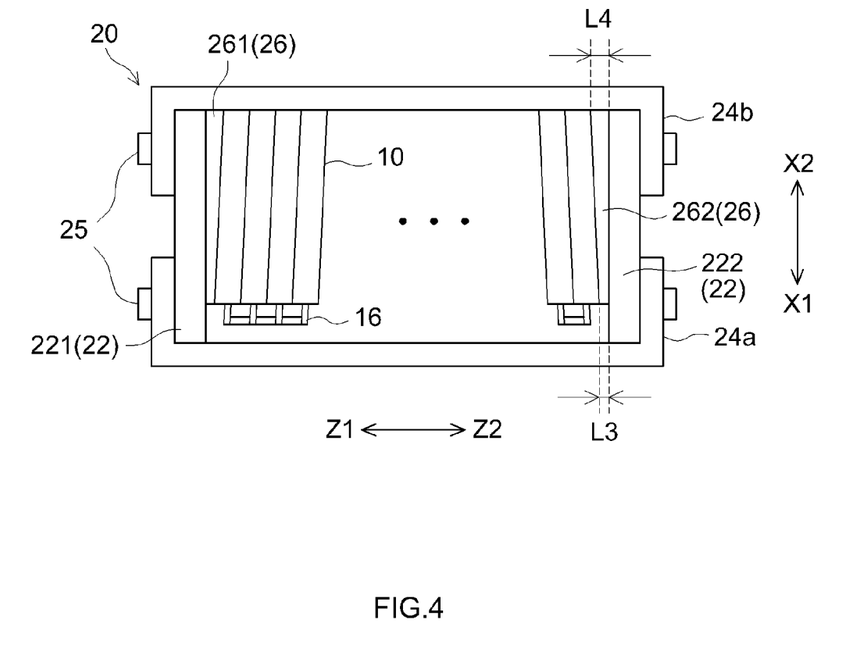
FIG. 4 is a frontal schematic view that explains the configuration of a battery pack according to another embodiment.

FIG. 4 is a frontal view that schematically illustrates a battery pack 1 according to another embodiment. The battery pack 1 shown in FIG. 4 is the same as that shown in FIG. 3, except that the configuration of the constraining mechanism 20 is different. Therefore, explanations of duplicate parts are omitted. The constraining members 24a and 24b are disposed along the end surfaces in the longitudinal direction X, in the same way as in FIG. 3, in order to make the configuration of the constraining mechanism 20 easier to see, but may also be disposed along the end surfaces in the transverse direction Y as shown in FIG. 1.

In the present embodiment, the constraining mechanism 20 is provided with a pair of end plates 22, constraining members 24a and 24b, fixing members 25 and an insertion member 26. Here, the thickness of the pair of end plates 22 is uniform. In addition, the length L1 of the constraining member 24a in the arrangement direction Z is the same as the length L2 of the constraining member 24b in the arrangement direction Z. For example, the constraining member 24a and the constraining member 24b can be prepared as identical members. In addition, the insertion member 26 in the present embodiment is constituted from a first insertion member 261 and a second insertion member 262. The first insertion member 261 is inserted between the bottom surface of the first end plate 221 at the top Z1 in the arrangement direction Z and the battery stack. In addition, the second insertion member 262 is inserted between the top surface of the second end plate 222 at the bottom Z2 in the arrangement direction Z and the battery stack.

In the present embodiment, the first insertion member 261 and the second insertion member 262 have substantially the same shape. The sizes of the insertion members 26 in the longitudinal direction X and transverse direction Y are each independently the same as, or slightly larger than, the sizes of the power-generating element of the single battery 10 in the longitudinal direction X and transverse direction Y. The thickness of the end in the first direction X1 of an insertion member 26 in the longitudinal direction X (the size in the thickness direction Z) is denoted by L3, the thickness of the end in the second direction X2 of the insertion member 26 in the longitudinal direction X (the size in the thickness direction Z) is denoted by L4, and L4 is greater than L3 (L3<L4). The first insertion member 261 and the second insertion member 262 are both configured so that the size in the thickness direction Z gradually increases from the side nearer to the external connection terminal 16 in the longitudinal direction X towards the side further from the external connection terminal. Due to this type of configuration, the distance between the pair of insertion members 26 gradually decreases from the first direction X1 towards the second direction X2 along the longitudinal direction X. Therefore, the constraining force applied to the battery stack gradually increases from the first direction X1 towards the second direction X2 along the longitudinal direction X. In other words, the constraining force applied to the plurality of single batteries 10 gradually increases in the longitudinal direction X from the side on which the external connection terminal 16 is provided towards the side on which the external connection terminal 16 is not provided. In the battery pack 1 disclosed here, the pressure gradient applied to the plurality of single batteries 10 increases from the first direction X1 towards the second direction X2.

The thickness L3 of the end in the first direction X1 and the thickness L4 of the end in the second direction X2 of the insertion member 26 in the longitudinal direction X can be appropriately designed in view of the sizes of the plurality of single batteries 10 in the arrangement direction Z following constrainment, the thicknesses (the sizes in the thickness direction Z) of the pair of end plates 22 and the sizes (the internal sizes of the channel shape) of the constraining members 24a and 24b in the arrangement direction Z so that the intended constraining force and gradient can be achieved.

In addition, the insertion members 26 are not particularly limited in terms of materials and the like as long as the members use a compression-resistant material capable of conveying the prescribed constraining force applied by the end plates 22 and constraining members 24a and 24b to the battery stack. For example, in the same way as the end plates 22 and constraining members 24a and 24b, the insertion members 26 can be constituted using materials that do not undergo plastic deformation when the prescribed constraining force is applied. Examples of such materials include metal materials such as aluminum, aluminum alloys, iron and a variety of steel materials (for example, structural steels) and high strength alloys: resin materials such as reinforced plastics and engineering plastics; inorganic materials having high bending strengths and/or tensile strengths, such as fine ceramics and carbon fiber materials; and composite materials of these, such as carbon fiber-reinforced plastics (CFRP).

The present embodiment is configured so as to use insertion members 26, the thicknesses of which vary in the longitudinal direction X, without making the sizes L1 and L2 of the constraining members 24a and 24b in the arrangement direction Z different from each other (L1=L2). The battery pack 1 disclosed here can be constructed in this way also. Due to this configuration, because there is no need to differentiate a constraining member 24a as a different member from a constraining member 24b, there are no concerns regarding mixing up constraining members 24a and constraining members 24b when constructing the battery pack 1 or storing members. In addition, in the constraining members 24a and 24b in Embodiment 1, both ends of a long band-like member do not have a shape that is folded at exactly 90°, and the constraining member 24a is folded at an angle of less than 90° (the angle during bending processing is greater than 90°), and the constraining member 24b is folded at an angle of greater than 90° (the angle during bending processing is less than 90°). Therefore, the production process for the constraining members 24a and 24b in Embodiment 1 is complex and requires high precision, and because a reaction force to the constraining force readily occurs as shearing stress at joining faces between end plates 22 and constraining members 24a and 24b, there are concerns that the load on fixing members 25 that fix the end plates 22 to the constraining members 24a and 24b will increase. This occurrence is particularly undesirable in a battery pack 1 in which a high constraining force is present, as mentioned above, or a battery pack 1 used in applications that may be used in environments where vibrations occur. However, according to the configuration of Embodiment 2, for example, the constraining members 24a and 24b can be processed by folding both ends of a long band-like member at exactly 90°. In addition, even in cases where a high constraining force is present in the constraining mechanism 20, a reaction force against the constraining force acts vertically on the end plates 22 and the constraining members 24a and 24b, and it is possible to prevent this reaction force from locally accumulating in fixing members 25. Therefore, the battery pack 1 can be constructed as a more stable structure.

Moreover, the insertion members 26 in the present embodiment are each configured from a pair comprising a first insertion member 261 and a second insertion member 262. However, the form of the battery pack disclosed here is not limited to this. For example, the insertion members 26 may be configured from a single member or three or more members. For example, in cases where the insertion members 26 are each configured only from a single insertion member 26, the insertion member 26 should be designed so that the degree of change in thickness in the longitudinal direction X is, for example, equal to the overall degree of change in thickness along the longitudinal direction X of the first insertion member 261 and second insertion member 262 mentioned above (for example, 2×(L4−L3)). In addition, in such a case, the insertion member 26 may be inserted so as to be adjacent to the bottom surface of the first end plate 221 or the top surface of the second end plate 222, or inserted between a plurality of single batteries 10. For example, the insertion member may be inserted close to the center of an arrangement of the plurality of single batteries 10. Such a configuration is preferable from the perspective of being able to configure the battery pack 1 using a smaller number of components.

In addition, in cases where insertion members 26 are each configured from three or more insertion members 26, the insertion members 26 should be designed so that the overall degree of change in thickness in the longitudinal direction X of all of the insertion members 26 is, for example, equal to the overall degree of change in thickness along the longitudinal direction X of the first insertion member 261 and second insertion member 262 mentioned above (for example, 2×(L4−L3)). In addition, in such a case, the three or more insertion members 26 are not limited to this, but the insertion members should, for example, be inserted so as to be adjacent to the bottom surface of the first end plate 221 and the top surface of the second end plate 222, and inserted between a plurality of single batteries 10. Such a configuration is preferable from the perspectives of being able to reduce tilt when assembling a plurality of single batteries 10 and being able to construct the battery pack 1 conveniently and with good precision.

Moreover, by varying the thicknesses of insertion members 26 in Embodiment 2, it is possible to adjust the pressure gradient of the constraining force applied to the plurality of single batteries 10. However, the form of the battery pack disclosed here is not limited to this. For example, although not explicitly shown in the drawings, the end plates 22 and insertion members 26 may be integrally configured. Specifically, the first end plate 221 and first insertion member 261, and the second end plate 222 and second insertion member 262, for example, may be mutually integrated. Such a configuration is preferable from the perspective of being able to construct the battery pack 1 using a smaller number of components.

Figure 5:
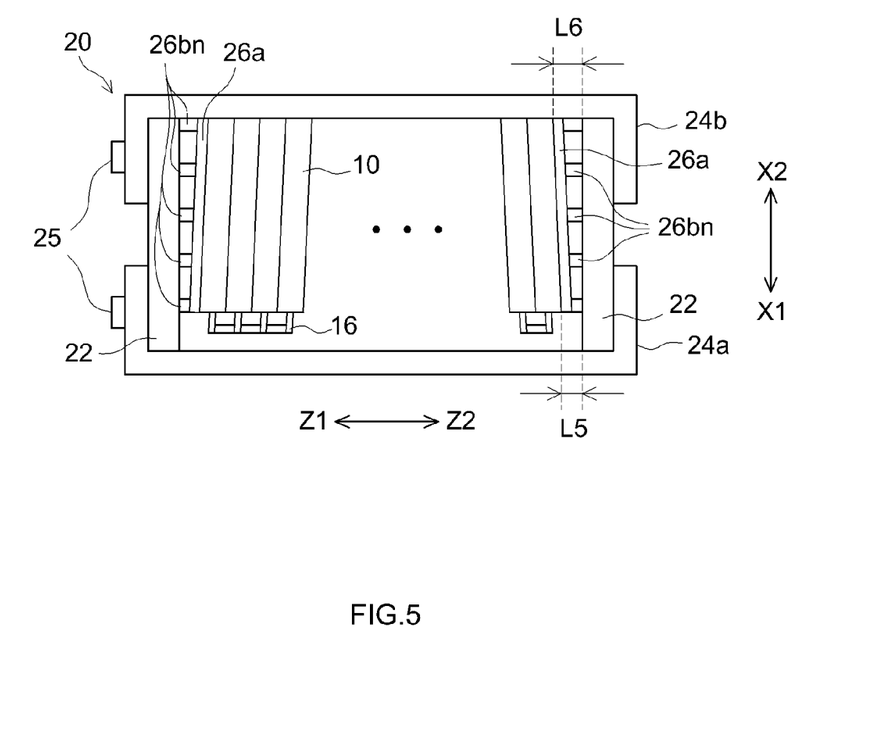
FIG. 5 is a frontal schematic view that explains the configuration of a battery pack according to another embodiment.

In addition, by varying the thicknesses of insertion members 26 in Embodiment 2, it is possible to adjust the pressure gradient of the constraining force applied to the plurality of single batteries 10. However, the form of the battery pack disclosed here is not limited to this. For example, insertion members 26 may be configured from a pair of plate-shaped insertion members 26a and a plurality of spacer members 26bn, as shown in FIG. 5. The plurality of spacer members 26bn are disposed between a plate-shaped insertion member 26a and an end plate 22, and adjust the distance between the plate-shaped insertion members 26a and the end plate 22. The sizes of the plurality of spacer members 26bn in the arrangement direction Z are designed so that the distance between a pair of plate-shaped insertion members 26a can ensure an appropriate constraining force and gradient thereof. For example, the plurality of spacer members 26bn can be designed so that the size L5 in the thickness direction Z, which is the sum of the thickness of the plate-shaped insertion member 26a and the thickness of the spacer member 26bn disposed at the first direction X1 end in the longitudinal direction, is the same as the thickness L3 of the first direction X1 end of the insertion member 26 in Embodiment 2 above. In addition, the plurality of spacer members 26bn can be designed so that the size L6 in the thickness direction Z, which is the sum of the thickness of the plate-shaped insertion member 26a and the thickness of the spacer member 26bn disposed at the second direction X2 end in the longitudinal direction, is the same as the thickness L4 of the second direction X2 end of the insertion member 26 in Embodiment 2 above. That is, the size L5 is smaller than the size L6 (L5<L6). By configuring an insertion member 26 of the battery pack 1 by combining a plate-shaped insertion member 26a and a plurality of spacer members 26bn in this way, it is possible to achieve an operational effect similar to that of Embodiment 2. By configuring an insertion member 26 from a plate-shaped insertion member 26a and a plurality of spacer members 26bn, it is possible to reduce the weight of the constraining mechanism 20.

Moreover, in Embodiment 2, the insertion members 26 may be constituted using, for example, a material that is high in elasticity (an elastic material). For example, a material having a coefficient of elasticity of 0.1 MPa or more, and typically 1 MPa or more for example, and $1 \times 10^4$ MPa or less, and typically 1×10' MPa or less for example, can be advantageously used as this type of elastic material. Specifically, natural rubber and a variety of synthetic rubbers, such as diene-based rubbers, styrene-butadiene copolymers, isoprene rubbers, butadiene rubbers, chloroprene rubbers and acrylonitrile•butadiene copolymers can be given as examples of the elastic material. By using an insertion member 26 comprising such a material, it is possible to advantageously absorb changes in volume caused by charging and discharging of the single battery 10 and possible to reduce fluctuations in the constraining load associated with charging and discharging. Such a configuration is particularly preferred for a battery pack 1 in which a material having high volumetric expansion, such as a carbon material or alloy-based material, is used as the negative electrode active substance of the single battery 10.

Embodiment 3

Battery Pack

Figure 6:
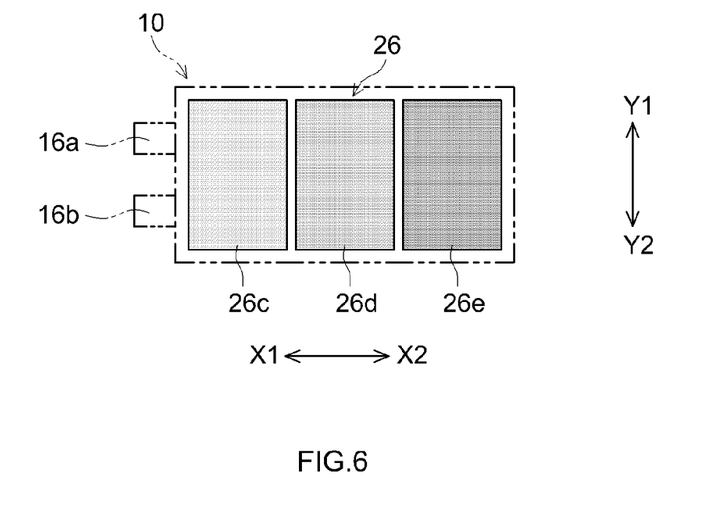
FIG. 6 is a planar schematic view that explains the configuration of an insertion member according to one embodiment.

FIG. 6 is a planar view that illustrates another form of one insertion member 26 (261 or 262) in the battery pack 1 of Embodiment 2. The configuration other than the insertion member 26 is the same as in Embodiment 2 (see FIG. 4), and duplicate explanations are omitted. This insertion member 26 is configured by being divided into multiple parts in the longitudinal direction X. In the present embodiment, the insertion member 26 is configured from three members, namely a first insertion member 26c, a second insertion member 26d and a third insertion member 26e, in that order, from the first direction X1 side in the longitudinal direction X. The insertion member 26, in isolation (when not incorporated in the battery pack 1), may have a uniform size (thickness) in the direction corresponding to the arrangement direction Z, and, for example, the thicknesses of the first insertion member 26c, second insertion member 26d and third insertion member 26e are the same. In addition, the materials that constitute the first insertion member 26c, second insertion member 26d and third insertion member 26e are specified so that the spring constant increases from the first direction X1 towards the second direction X2 in the longitudinal direction X. In other words, the insertion member is constituted in such a way that the spring constant increases in the order of the first insertion member 26c, second insertion member 26d, and third insertion member 26e.

The battery pack 1 is constructed using this type of insertion member 26 and constraining member 24a and 24b, the sizes L1 and L2 of which in the arrangement direction Z are the same. Here, the sizes of the arranged end plates 22, battery stack and insertion members 26 in the arrangement direction Z before a constraining force is applied are uniform in the longitudinal direction X. Here, by applying a prescribed constraining force in the arrangement direction Z, a reaction to the constraining force from the first insertion member 26c, second insertion member 26d and third insertion member 26e increases in the order of the first insertion member 26c, second insertion member 26d, and third insertion member 26e, proportionally to the spring constants thereof. In other words, of the pressing force that the insertion members 26 exert on the battery stack, that portion of the pressing force that corresponds to the first insertion member 26c is relatively small, that portion that corresponds to the third insertion member 26e is relatively large, and that portion that corresponds to the second insertion member 26d lies between these. As a result, when the battery pack 1 is constructed, the size of the battery pack 1 as a whole is uniform in the arrangement direction Z, as shown in FIG. 4 for example, but the thicknesses of the insertion members 26 increases (becomes thicker) from the first direction X1 towards the second direction X2. Conversely, the thicknesses of the plurality of single batteries 10 decreases (becomes thinner) from the first direction X1 towards the second direction X2. In other words, the constraining force applied to the plurality of single batteries 10 increases from the first direction X1 towards the second direction X2. The battery pack 1 disclosed here can be configured in this way also.

This type of insertion member 26 can be realized by constructing the first insertion member 26c, second insertion member 26d and third insertion member 26e from materials having different spring constants. The members 26c, 26d and 26e that constitute the insertion member 26 may be constituted from, for example, bulk elastic structures (for example, rubber sheets) comprising the elastic materials mentioned above. Due to this configuration, it is possible to construct the insertion member 26 by setting the shapes and spring constants of the first insertion member 26c, second insertion member 26d and third insertion member 26e to be continuous, with no gaps.

Moreover, in the present specification, the term "spring constant" indicates the load required to impart a target material with a prescribed deformation stroke amount, and is, for example, represented by the formula: spring constant (N/mm)=load (N)÷displacement (mm). In the disclosure, because the amount of deformation and the constraining force of the insertion member 26 need to be controlled, deformation characteristics of the insertion member 26 are specified using this indicator. Therefore, the materials that constitute the insertion member 26 do not necessarily require a spring structure. In addition, the spring constant is not necessarily a proportional constant that indicates the deformation characteristics of a target material within an elastic deformation region (in other words, the spring constant does not need to conform to Hooke's law), and may indicate deformation characteristics in a non-elastic region.

Alternatively, the members 26c, 26d and 26e that constitute the insertion member 26 may be constituted from a combination of a plate-shaped insertion member and a spring body having a variety of structures, such as a pressing spring, a conical spring, a square spring, a torsion spring, a line working spring, a leaf spring or a disc spring. The spring body is not limited to these, but can be advantageously produced using a spring-forming material such as a hard steel wire (SW-C), type A piano wire (SWP-A), type B piano wire (SWP-B), a spring-use stainless steel wire (SUS304WPB), a spring-use oil-tempered silicon chromium steel wire (SWOSC-B), a valve spring-use oil-tempered silicon chromium steel wire (SWOSC-V), a hot-formed Mn-Cr steel spring material (SUP9), or a spring-use titanium alloy (Ti-224 alloy or the like), which are specified by JIS or the like. In addition, in order to be able to achieve n intended spring constant, the spring body can be designed, as appropriate, in terms of material, wire thickness, winding diameter, number of windings, coil pitch, and the like.

The spring constants of the insertion members 26c, 26d and 26e, and the gradient thereof, are not particularly limited. For example, the spring constant of the insertion member 26 can be set within a range such as 1 to 20 N/mm. It is more preferable for the spring constants of the insertion members 26c, 26d and 26e to be proportional to the position of the insertion members 26c, 26d and 26e in the longitudinal direction X so that the amount of deformation of the insertion members 26c, 26d and 26e by the prescribed constraining force decreases smoothly towards the second direction X2 in the longitudinal direction X. For example, the spring constants of the insertion members 26c, 26d and 26e should vary on the basis of a first order correlation in terms of the distance ($x_1$) of the insertion members 26c, 26d and 26e from a base point ($x_0$) in the second direction X2, with the base point ($x_0$) being the end of the single battery in the first direction X1. Here, the distance ($x_1$) of an insertion member 26c, 26d or 26e from the base point ($x_0$) can be, for example, the position of the center of the insertion member 26c, 26d or 26e in the second direction X2.

Due to this configuration, it is possible for the members to have the same size in the arrangement direction Z before the constraining force is applied when the insertion member is attached to the battery pack 1, and possible to construct the battery pack 1 conveniently and with high precision. As a result, it is possible to assemble the battery pack 1 with a more suitable load and greatly increase the performance and durability of the battery pack 1.

Figure 7:
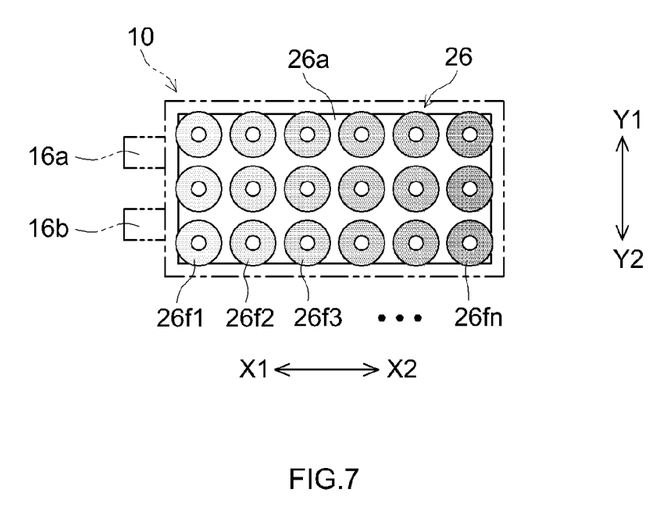
FIG. 7 is a planar schematic view that explains the configuration of an insertion member according to another embodiment.

Moreover, in the present embodiment 3, one insertion member 26 was configured from three members, namely a first insertion member 26c, a second insertion member 26d and a third insertion member 26e, in that order, from the first direction X1 side in the longitudinal direction X. However, the form of the battery pack disclosed here is not limited to this. For example, the insertion member 26 may be constituted from an arbitrary number of constituent members. For example, the insertion member 26 may be configured using a combination of a plurality of spring bodies $26f_1, 26f_2 \ldots 26f_n$ is a natural number), which are arranged across an electrode surface in a direction perpendicular to the arrangement direction (across the XY plane), and a single plate-shaped insertion member 26a, as shown in FIG. 7. In the example shown in FIG. 7, the number of spring bodies $26f_n$ is three in the transverse direction Y and n in the longitudinal direction, and the total number of spring bodies $26f_n$ is (3×n). Here, the spring constants of the three spring bodies $26f_n$ arranged in the transverse direction Y are the same. In addition, the spring constants of the n spring bodies $26f_n$ arranged in the longitudinal direction X are set so as to gradually increase from the first direction X1 towards the second direction X2. Due to this configuration, the constraining force applied to the plurality of single batteries 10 can be increased from the first direction X1 towards the second direction X2. The battery pack 1 disclosed here can be configured in this way also.

Due to this configuration, an insertion member 26 having a plurality of spring constants in spring bodies $26f_n$, and a gradient thereof, can be constructed conveniently and with high precision. Due to this configuration, the battery pack 1 disclosed here can be constructed far more conveniently and with high precision, and can withstand a higher constraining force. As a result, the performance and durability of the battery pack 1 can be greatly increased.

As explained above, the constraining force applied to the single battery 10 by the constraining mechanism 20 varies according to the distance from the external connection terminal 16 in the battery pack 1 disclosed here. Specifically, the battery pack is configured so that the constraining force increases as the distance from the external connection terminal 16 increases. Due to this configuration, internal resistance in the single battery 10 can be advantageously improved, and current density becomes uniform. As a result, it is possible to achieve an advantageous effect, namely achieving a balance between improved performance and improved reliability in the battery pack 1.

The battery pack 1 can be used in a variety of applications. The battery pack 1 can be advantageously used as, for example, a driving power source (primary battery) for a driving motor fitted to a vehicle. The type of vehicle is not particularly limited, but typical examples thereof include plug-in hybrid vehicles (PHV), hybrid vehicles (HV) and electric vehicles (EV).

The present disclosure has been explained in detail above, but the embodiments shown above are merely exemplary, and the disclosure includes embodiments obtained by variously modifying or altering the specific examples shown above.

What is claimed is:

1. A battery pack comprising:
  a plurality of single batteries, in each of which an electrode plate and a solid electrolyte layer are housed in a battery case and which are arranged in a thickness direction of the electrode plates and solid electrolyte layers as an arrangement direction, and
  a constraining mechanism that constrains the arranged plurality of single batteries in such a way that stress exists in a direction of compression along the arrangement direction, wherein
  each of the single batteries does not contain an electrolyte solution, and is provided with external connection terminals that are connected to the electrode plates and extend to an outer part of the battery case, and
  when a direction in which the external connection terminals extend from the inside to the outside of the battery case is deemed to be a first direction and a direction opposite the first direction is deemed to be a second direction,
  the constraining mechanism is configured in such a way that the stress increases from the first direction towards the second direction.

2. The battery pack according to claim 1, wherein the constraining mechanism comprises:
  a pair of end plates that are disposed at both ends in the arrangement direction so as to hold the arranged plurality of single batteries,
  a constraining member laid across the pair of end plates and regulate the distance between the end plates, and
  an insertion member disposed between the pair of end plates,
  wherein
  the insertion member is configured in such a way that a size of the insertion member in the arrangement direction increases from the first direction towards the second direction.

3. The battery pack according to claim 1, wherein the constraining mechanism is provided with
  a pair of end plates that are disposed at both ends in the arrangement direction so as to hold the arranged plurality of single batteries,
  constraining members which are laid across the pair of end plates and regulate the distance between the end plates, and
  an insertion member disposed between the pair of end plates,
  wherein
  the insertion member is configured in such a way that a spring constant of the insertion member increases from the first direction towards the second direction.

4. The battery pack according to claim 3, wherein the size of the insertion member in the arrangement direction is uniform.

5. The battery pack according to claim 2, wherein the insertion member is constituted of an elastic material.

6. The battery pack according to claim 3, wherein the insertion member is constituted of an elastic material.

* * * * *